United States Patent
Hedman

(10) Patent No.: US 8,973,541 B2
(45) Date of Patent: Mar. 10, 2015

(54) PRESSURE PULSE GENERATOR

(75) Inventor: Mats Hedman, Sparreholm (SE)

(73) Assignee: Perfecter AB, Katrineholm (SE)

( * ) Notice: Subject to any disclaimer, the term of this patent is extended or adjusted under 35 U.S.C. 154(b) by 0 days.

(21) Appl. No.: 14/123,569

(22) PCT Filed: Jun. 3, 2012

(86) PCT No.: PCT/SE2012/000085
§ 371 (c)(1),
(2), (4) Date: Dec. 3, 2013

(87) PCT Pub. No.: WO2012/166035
PCT Pub. Date: Dec. 6, 2012

(65) Prior Publication Data
US 2014/0102386 A1    Apr. 17, 2014

(30) Foreign Application Priority Data
Jun. 3, 2011    (SE) .................................... 1100435

(51) Int. Cl.
F01L 9/02    (2006.01)
F01L 1/02    (2006.01)
F16K 31/122    (2006.01)
F16K 31/124    (2006.01)
F15B 21/12    (2006.01)

(52) U.S. Cl.
CPC ............... *F01L 1/02* (2013.01); *F16K 31/1225* (2013.01); *F16K 31/124* (2013.01); *F15B 21/12* (2013.01); *F01L 9/02* (2013.01)
USPC ..................................... 123/90.12; 123/90.15

(58) Field of Classification Search
USPC ................ 123/90.15, 90.11, 90.16, 90.12
See application file for complete search history.

(56) References Cited

U.S. PATENT DOCUMENTS

| | | | |
|---|---|---|---|
| 3,727,595 A | 4/1973 | Links | |
| 5,193,495 A | 3/1993 | Wood, III | |
| 5,572,961 A * | 11/1996 | Schechter et al. | ......... 123/90.12 |
| 2003/0150415 A1 | 8/2003 | Hedman | |
| 2006/0086328 A1 | 4/2006 | Hedman | |
| 2006/0254543 A1 | 11/2006 | Sun | |
| 2007/0272180 A1 | 11/2007 | Lou | |

FOREIGN PATENT DOCUMENTS

| | | |
|---|---|---|
| DK | 154165 B | 10/1988 |
| SE | 520993 C2 | 9/2003 |
| SE | 522163 C2 | 1/2004 |
| WO | 2007094732 A1 | 8/2007 |

OTHER PUBLICATIONS

International Search Report, dated Sep. 4, 2012, from corresponding PCT application.

* cited by examiner

*Primary Examiner* — Zelalem Eshete
(74) *Attorney, Agent, or Firm* — Young & Thompson

(57) ABSTRACT

A pressure pulse generator includes a cylinder (2), a body (9) connected to the cylinder (2), a first channel (15) extending from the cylinder (2) to a pressure sink LP, a pressure fluid circuit having a second channel (4) extending to the cylinder (2) from a pressure source HP, an actuator piston (3) being displaceable arranged, a controllable first valve body (5) arranged in the second channel (4) to open or close a pressure fluid flow in the second channel (4), an electro element (7) to control the valve body (5), a second valve body (8) arranged at or to the second channel (4) for opening or closing of the channel (4). The second valve body (8) is an element rigidly connected to the actuator piston (3).

11 Claims, 4 Drawing Sheets

PRESSURE PULSE GENERATOR

The invention relates to a pressure pulse generator of the kind referred to in claim 1.

The invention is suited to control the inlet and the outlet valves of engines having an internal or external heat source. In 2-stroke engines the exchange of gas can occur via valves in the cylinder head. In 4-stroke engines the camshaft can be eliminated. In 2- and 4-stroke engines it is possible to use variable compression. Said engines are a specially preferred application.

The pressure fluid to act on the actuator piston in the pressure pulse generator is air in a preferred design, but another gas can be used as well.

When the invention is described and saying that a valve body is opened and closed it is meant that it is opened and closed for a pressure fluid flow in a channel passing the position where the valve body is arranged. The meaning of open and closed position respectively shall be understood in a corresponding way. When an electro element is used in the description it is a kind of a future directed expression including the action of electromagnets of today.

The patent applications SE0201613-7 and SE0002597-3 disclose pressure pulse generators to control inlet and outlet valves of combustion engines. The first mentioned patent need four electro magnets and the second mentioned patent need two electro magnets. The principles of mentioned patents are complex which cause instability at the valve control and unnecessary high manufacturing costs. The present invention shows a new principle using just one electromagnet, which increases the stability at the valve control and decreased manufacturing costs.

The object of the invention is to avoid said problems in the prior art technique.

This object is achieved by a pressure pulse generator, which when activating an electro element will displace a the first valve body to a position where it keeps the first channel closed for evacuating pressure fluid and a second channel open for filling pressure fluid at the same time as a second valve body keeps said second channel open for filling pressure fluid.

A hydraulic locking will cause the actuator piston and thus also the engine valve to be held in its second remote position an eligibly long time. Said third channel will be closed to evacuate of hydraulic fluid which by passing a check valve will fill a volume created in the displacement of the second valve body and when this is moved to its remote turning point the valve body will be locked in this position with the completing actuator piston. When the electro element is deactivated the first valve body will return to its starting position opening said third channel to evacuate hydraulic fluid and the second valve body with the completing actuator piston can be returned to its first position, the home position.

In the starting home position where the second valve body is open to a pressure fluid flow the first valve body will open to a pressure fluid flow, which results in, as the pressure fluid acts on the actuator piston, a displacement of the actuator piston in an adjusted cylinder and thus the second valve body which after a certain displacement will close for the pressure fluid flow acting on the actuator piston. Thus there is a certain length of the displacement of the actuator piston from a given home position, which decides the length of the pressure pulse. It is an electro element controlled valve body, the first valve body, being controlled to open for a flow of pressure fluid and thus initiate a pressure pulse, which will be cut of mechanically by the second valve body after a certain displacement away from the home position. The length of the pressure pulse is the distance between the first valve body forward to the point where the second valve body will cut off the pressure fluid. It is to be noticed that the pulse length will be equally stable each time the electromagnet is initiated. There is given a direct relation between the length of the pulse and the valve lift, that is the displacements of the actuator piston and thus the engine valve taking place.

The other valve body, the actuator piston shaft is characterized by being narrower in that part being rigidly connected to the actuator piston. The narrower part is introduced at or close to the actuator piston and has a certain length towards a wider part of the actuator piston shaft being more remote from the actuator piston. Said length of the narrow part will together with the speed of the actuator piston in its displacement decide how long time the pressure fluid shall flow into the cylinder and act onto the actuator piston. The actuator piston shaft will move forwards and backwards in a channel and the wide part of the actuator piston shaft above the narrow part, has a diameter being adjusted to the diameter of said channel so that the pressure fluid can flow down towards the actuator piston passing the narrow part of the actuator piston shaft, but not in the opposite direction.

The actuator piston is kept pre tensioned in the home position by a mechanical or pneumatic spring which will act in the same way as for camshaft controlled valves to keep the engine valves closed or to return them to a closed position after being opened. The pressure pulse of pressure fluid which according to the specification above acts to open the engine valve will be counteracted of said spring acting to close the engine valve. It is mainly the relation between the opening and closing forces and the duration of the pressure fluid pulse at a certain pressure in the fluid that decides where the remote turning point, the valve lift, of the actuator piston and by this also the engine valve, occurs.

To have the actuator piston returned to its home position there is an evacuating channel ending in the roof of the cylinder in which the actuator piston runs. When pressure pulses are generated and during the displacement of the actuator piston to its remote turning point this evacuating channel will be closed. The characterizing part of the invention is that the first valve body, at the same time as it is open for flow forward to the actuator piston will close for flow by the evacuating channel out of the cylinder. When the actuator piston shall return or returns it is opened for evacuation of the pressure fluid being introduced to move the actuator piston and thus to open the engine valve.

The second valve body, the actuator piston shaft, runs in a channel. In the home position of the actuator piston a second channel connects to this channel from the side to that part where the shaft of the actuator piston is narrow. In this second channel the first valve body is positioned so that it can open or close for a flow of pressure fluid forward the said narrow part of the shaft of the actuator piston. Activating the electro magnet will open for flow of pressure fluid forward to the narrow part and pressure fluid will flow further along this narrow part down into the cylinder to the upper side of the actuator piston and forces it and a accompanying motor valve to be moved in an opening to bring forward air to the combustion or to let out exhaust gases. When the actuator piston and the motor valve shall return or return to the home position the electro magnet is deactivated and the first valve body is forced to close the second connecting channel so that pressure fluid not again can flow down into the cylinder when the narrow part of the actuator piston shaft will return to a position where pressure fluid otherwise should flow from the other connecting channel forward toward to the actuator piston. When the electro magnet is deactivated it also opens to allow an evacuation of the pressure fluid being brought to the cylinder to displace the actuator piston and thus open the engine valve.

The pressure pulse generator according to the invention can be provided with a hydraulic lock being activated when activating the electro element and the first valve body being displaced and the second valve body being displaced to its remote turning point. Signs are that the displacement of the first valve body being caused by activating the electro element will close for a flow of hydraulic fluid and, when deactivating the electro element, opens for a flow of hydraulic fluid.

The figures show an embodiment where

Figure 1:
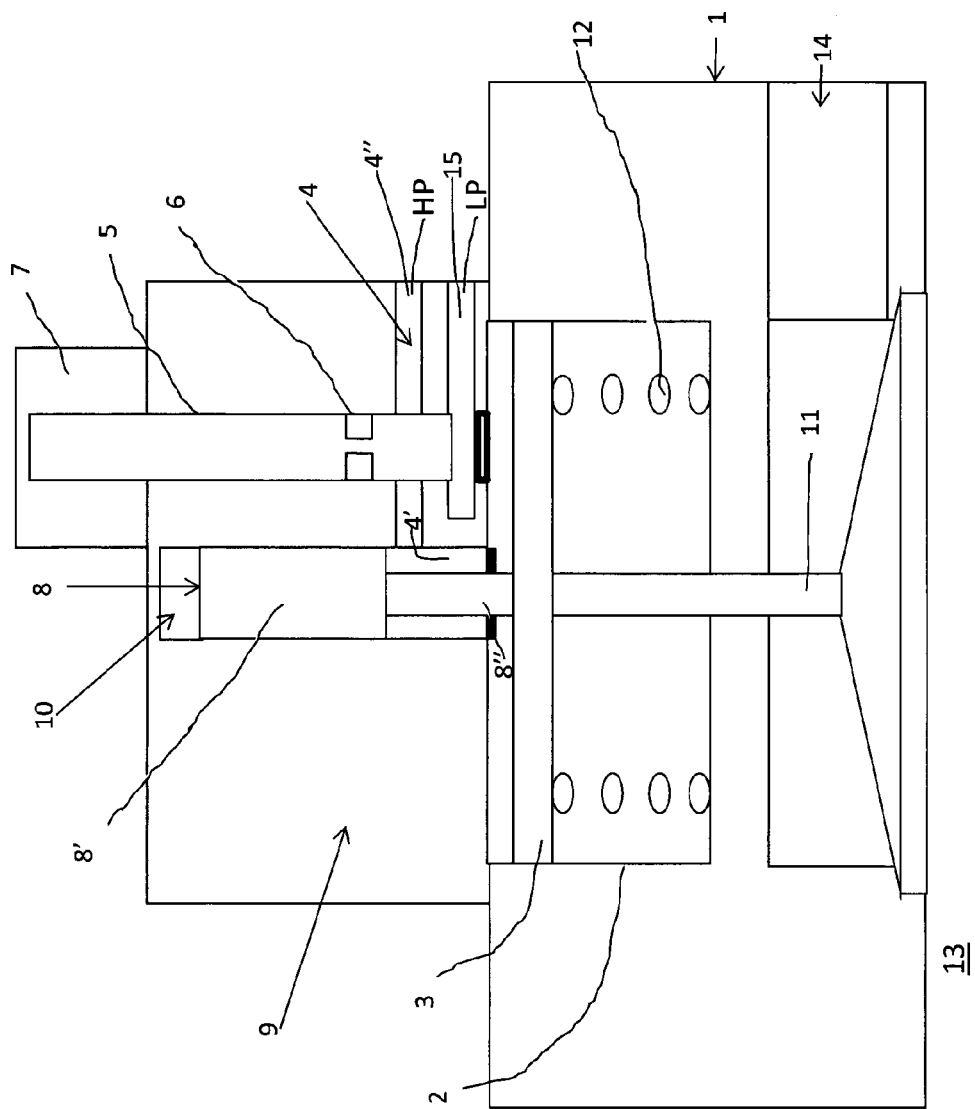
FIG. 1 is a partly sectional side view of a pressure pulse generator according to the invention in a first position, the home position, and where

FIG. 1 discloses a cylinder head 1 with the pressure pulse generator according to the invention being a part of a valve actuator for a 2- or 4-stroke internal combustion engine. Beneath the cylinder head there is a combustion chamber 13. A poppet valve will close the combustion chamber for a flow to or from the same by a channel 14. A hydraulic circuit 10 will, according to prior art, perform a breaking action on the poppet valve to a suitable degree in the moment it shall be closed and closes. A cylinder 2 having an actuator piston 3 may be included into or mounted onto the cylinder head. The pressure pulse generator is in a body 9 onto the cylinder 2.

The pressure pulse generator comprises a cylinder 2 and a displaceable actuator piston 3 in the cylinder 2, a pressure fluid circuit having a second channel 4 extended to the cylinder 2, an electro element controlled first valve body 5 in said channel 4 to open, via an opening 6 in the valve body 5, or closing a flow of pressure fluid in channel 4 and another valve body 8 also in the channel 4 for opening or closing of said channel. The valve body 8 comprising a wider part 8' and a narrower part 8" being rigidly connected to the actuator piston 3, which in turn rests on or is rigidly connected to the stem of the poppet valve 11. Channel 4 comprises two part channels 4' and 4". The part channel 4" emerging from the side forward to the part channel 4'. The second valve body 8 is displaceable in channel 4'. The wider part 8' of the valve body has a diameter corresponding to the diameter of the channel 4'. The narrow part 8" of the valve body 8 have an extension being equally long as or longer than the distance between the crossing between the part channels 4' and 4" and the ending of the channel 4 into the cylinder 2. The figure discloses the initial position of the engine valve 11 and the actuator valve 3, the one end position or the home position. In this position is the narrow part 8" of the second valve body outside of the orifice of the part channel 4" in the part channel 4' and keeps open for pressure fluid to flow through the channel into the cylinder 2. Here it shall be mentioned that the electro element 7 triggering the first valve body 5 may act directly onto the valve body as the figure simply shows, or acting indirectly with a so called pilot-slave function. Here it shall also be mentioned that the expression electro element means an element being activated by a signal from computer based control system and thus performing a displacement. Today electro magnets are typical electro elements but there is an ongoing development leading to other solutions corresponding to the action of an electro magnet. Here the intention is that by activating the electro element a displacement from a defined starting position takes place towards one direction and when deactivating the electro element the displacement is towards the other direction back to said starting position.

Figure 2:
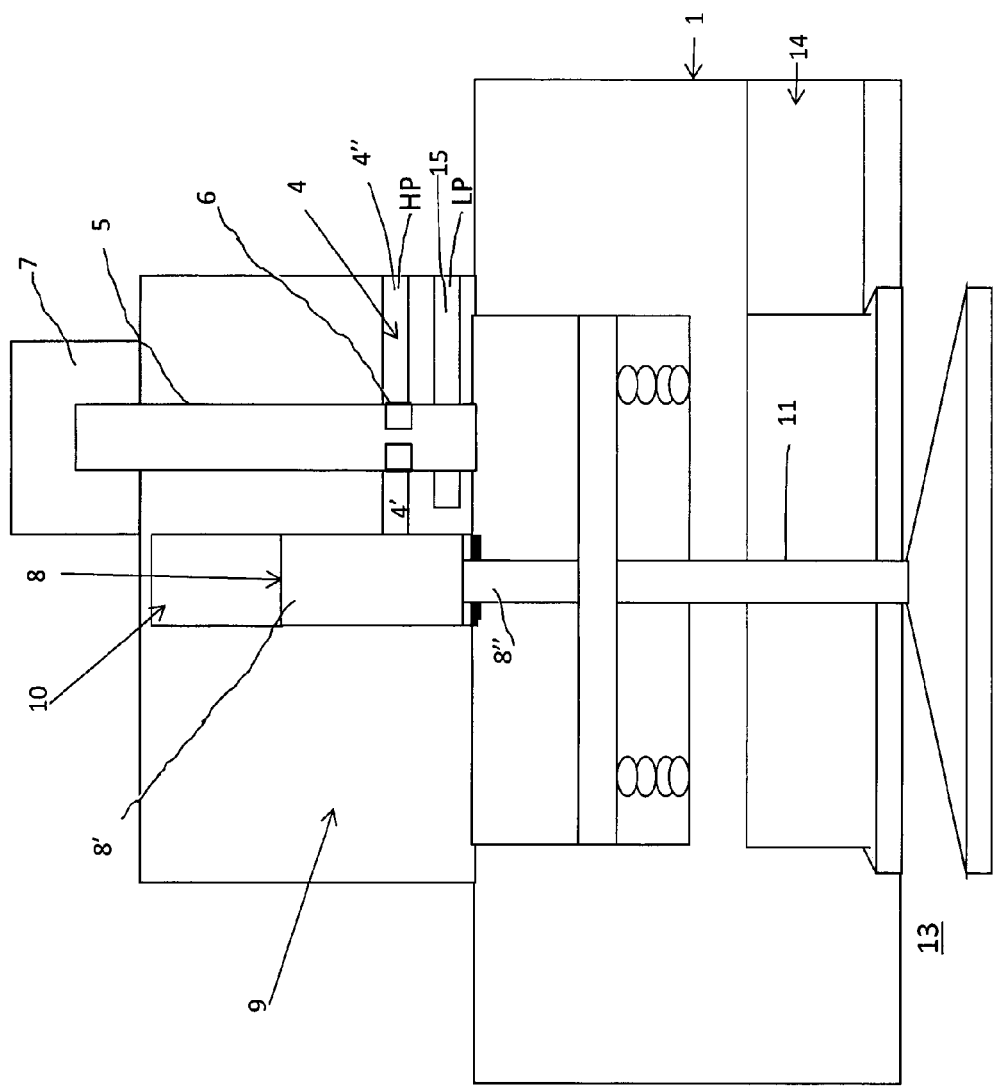
FIG. 2 is the same view in a second position, the remote position.

When the first valve body 5 is activated by the electro element 7 and is opened for flowing of pressure fluid from a high pressure source HP in second channel 4 by the opening 6 of the valve body the pressure fluid will act towards the actuator piston 3 and displace this from a first position, the home position, as shown in FIG. 1 to the second position, the remote position, as shown in FIG. 2. The two positions are the end positions of the piston. On its way to the second position the wider part 8' of the valve body will be placed right in front of the orifice 4' of the part channel 4" and close for a continued pressure fluid flow in the channel 4.

To keep the poppet valve closed towards the combustion chamber it is pre tightened with its shaft in direction towards the home position by a mechanical spring 12 or some other type of spring, e.g. a pneumatic spring. The actuator piston may be rigidly connected to the valve stem as is shown in the figures, but may also rest on the pre tightened valve shaft in a here not shown variant. Different solutions may be created without departing from the invention.

The cylinder 2 has a first channel 15 to evacuate the pressure fluid being brought to the cylinder when activating the electro element 7 and the following displacement of the actuator piston 3. Evacuation takes place to the low-pressure source LP and is necessary to have the actuator piston to return to its home position by assistance of the spring 12. When the first valve body has opened for flow of pressure fluid to the cylinder by the other channel 4 it has also closed for evacuating to LP by the first channel 15 according to FIG. 2. Said opening for flow in the channel 4 shall not occur prior to closing for evacuating to channel 15, but the opening shall occur not earlier than closing, otherwise there is a risk of loosing pressure fluid prior to being allowed to have a full impact onto the actuator piston 3 to displace it.

In a preferred embodiment there is a suitable electronic based control system having suitable software ordering the electro element 7 to activate the pressure pulse generator to deliver pressure pulses being used for a repeated opening and closing of present outlet and inlet valves 11 respectively to a combustion chamber of an engine to perform the gas exchange. In a preferred embodiment each electro element 7 will be hold activated for so long period of time that the actuator piston 3 have reached its remote turning point prior to said first valve body 5 opens to evacuate pressure fluid. On the actuator pistons way back towards the home position the electro element shall not be deactivated after the moment when there is enough time to evacuate a sufficient amount of pressure fluid to stop a not wanted rebound from occurring.

A pressure pulse is generated which will send away the engine valve 11 from the home position in an opening displacement, and when the displacement stops by influence from the spring 12 the engine valve has reached its remote position and will immediately start its way back to the home position. The time to leave the home position and return to it again, the duration, may reach a few milliseconds. Large valve lifts having a short duration will allow a possible good gas exchange and high rotation speeds. If the pressure pulse generator does have the described hydraulic circuit to lock the actuator piston in its remote position the actuator piston cannot initiate its return displacement towards the home position prior to deactivating the electro element. The electro element has to be activated to have the first valve body displaced from a starting position, and deactivated to have said valve body returning to said starting position.

It shall be stressed that the pressure pulse generator according to FIGS. 1-4 are shown diagrammatically in that that certain details are provided to be present in spite of not being shown in the figures. Thus neither the principle of the breaking action of the hydraulic circuit when closing the engine valve nor that a spring is arranged to return the first valve body after deactivating the electro element are shown.

Figure 3:
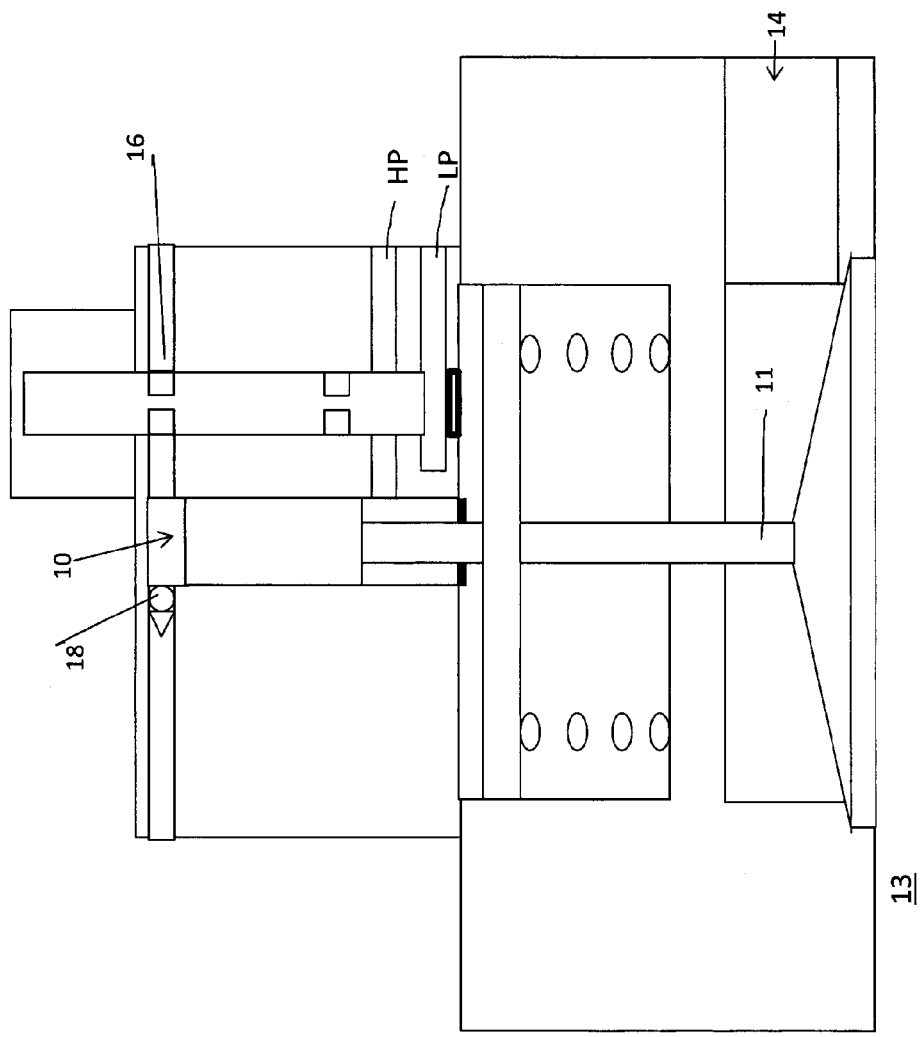
FIG. 3 shows the pressure pulse generator having a hydraulic lock in a first position and FIG. 4 the same view in a second position.

In FIG. 3 the cylinder head 1 having the pressure pulse generator is shown where the hydraulic circuit 10 being completed to a preferred embodiment for the exhaust valves when the present invention being applied to a 4-stroke drive and at variable compression at both 2-stroke and 4-stroke engines. At variable compression an engine valve does not displace but a piston in the head of the combustion chamber 13 in the cylinder head 1 does—not shown in figure.

Figure 4:
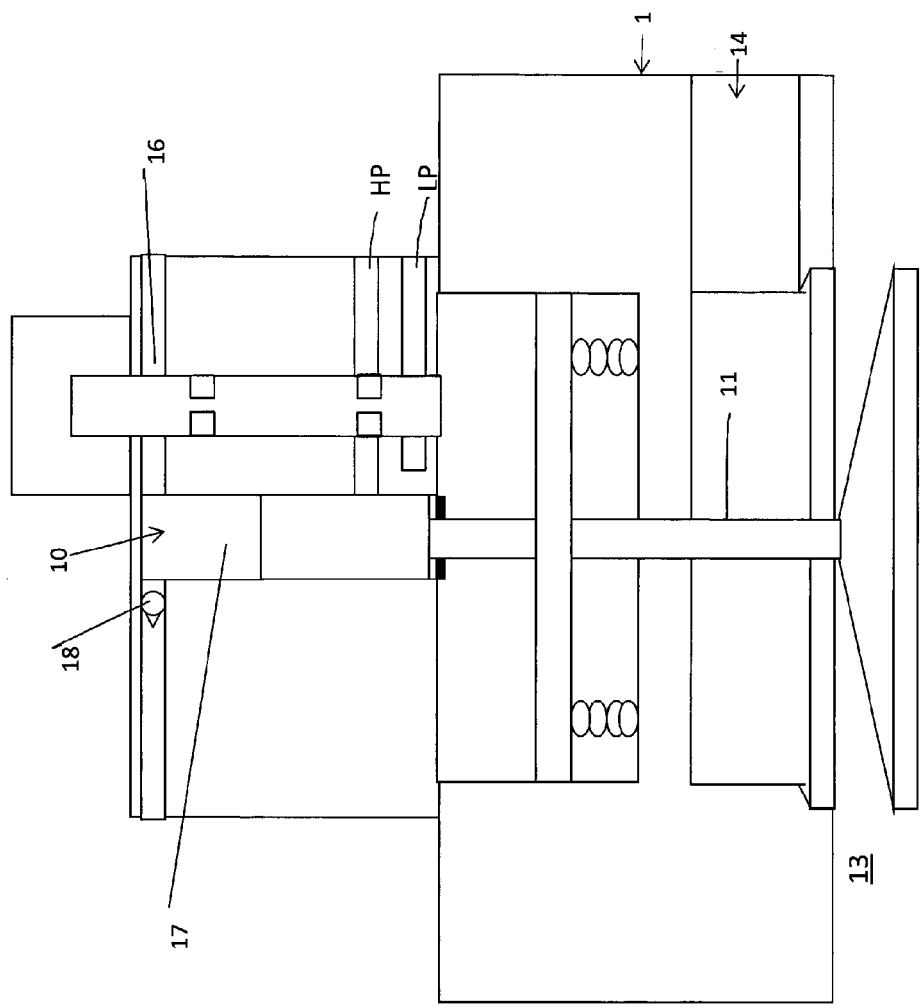

The hydraulic circuit have been provided with a check valve 18 and an opening at a third channel 16 in the first valve body 5. When the electro element 7 being activated the displacement of the first valve body will close it's opening at the channel 16 for a flow of hydraulic fluid out of said circuit 10. As described above the second valve body is displaced as a consequence of the displacement of the first valve body in that hydraulic fluid will pass the check valve 18 and will fill the space 17 being created. When the actuator valve has reached its remote position the spring 12 cannot return it to the home position in that the hydraulic fluid not finding any way out of the space 17. This is caused by the check valve together with the first valve body will close for flow out of said space 17, which is shown in FIG. 4.

The invention is not restricted to the above shown embodiment but modifications can be made within the scope of the following claims.

The invention claimed is:

1. Pressure pulse generator comprising
   a cylinder (2)
   a first channel (15) extending from the cylinder (2) to a pressure sink LP
   a second channel (4) extending to the cylinder (2) from a pressure source HP
   a controllable first valve body (5) arranged in the channel (4) to open or close a pressure fluid flow in the channel (4)
   an electro element (7) to control the valve body (5)
   an actuator piston (3) being displaceable arranged in the cylinder (2)
   a spring (12) applied in the cylinder (2) to use its spring action to keep the actuator piston (3) in its home position and to return the actuator piston to the home position after having left the same
   a second valve body (8) rigidly connected to the actuator piston and arranged at or in the channel (4) for opening or closing of said second channel (4),
characterized in that when activating an electro element (7) the first valve body (5) will displace from an starting position keeping the first channel (15) open and the second channel (4) closed to a position where it keeps the first channel (15) closed and the second channel (4) open at the same time as the second valve body (8) keeps the channel (4) open wherein a pressure pulse of pressure fluid from the pressure source HP is generated bringing the actuator piston (3) with adherent second valve body (8) to displace from the home position towards the remote position and that during said displacement of the second valve body (8) the second channel (4) will close and thus having the pressure pulse to terminate and that the first valve body (5) keeps the first channel (15) closed for evacuation of pressure fluid out of the cylinder (2) until the electro element (7) is deactivated and the first valve body (5) returns to its starting position.

2. Pressure pulse generator according to claim 1 also including
   a hydraulic circuit (10) with a check valve (18)
   a third channel (16) to evacuate hydraulic fluid, characterized in that when activating the electro element (7) the first valve body (5) is displaced from its starting position to a position where it keeps the first channel (15) closed and the second channel (4) open and the third channel (16) closed at the same time as the second valve body (8) keeps the channel (4) open wherein a pressure pulse of pressure fluid from the pressure source HP will be generated bringing the actuator piston (3) with adherent second valve body (8) to be displaced from the home position towards the remote position and that during said displacement hydraulic fluid will flow passing the check valve (18) into a chamber (17) being created by the displacement of the second valve body (8) and when the remote position is achieved said chamber (17) is blocked for outflow of hydraulic fluid until the electro element (7) is deactivated and that thereby the first valve body (5) returns to its starting position whereby the third channel (16) opens for flow of hydraulic fluid out of the chamber (17) and the actuator piston can be returned to its home position.

3. Pressure pulse generator according to claim 1 characterized in that in the home position of the actuator piston the first valve body (5) is arranged, by the first channel (15), to close for pressure fluid flow out of the cylinder (2) and that thereafter or at the same time, by the second channel (4), open for flow of pressure fluid into the cylinder (2).

4. Pressure pulse generator according to claim 1, characterized in that the second channel (4) consisting of two part channels (4',4") where the second part channel (4") will lead from the high pressure source HP to the first part channel (4') in which the second valve body (8) is displaceable arranged and the second valve body (8) includes a narrow part (8") in the home position positioned opposed to the second part channel (4") and that said narrow part has an extension being equally long as, or longer than the distance between the opening of the first part channel (4') in the cylinder (2) and the opening of the second part channel (4") in the first part channel (4').

5. Pressure pulse generator according to claim 1 characterized in that it is included in a valve actuator having an engine valve (11) and that the actuator piston (3) rests on or is rigidly connected to the engine valve.

6. Pressure pulse generator according to claim 2, characterized in that in the home position of the actuator piston the first valve body (5) is arranged, by the first channel (15), to close for pressure fluid flow out of the cylinder (2) and that thereafter or at the same time, by the second channel (4), open for flow of pressure fluid into the cylinder (2).

7. Pressure pulse generator according to claim 2, characterized in that the second channel (4) consisting of two part channels (4',4") where the second part channel (4") will lead from the high pressure source HP to the first part channel (4') in which the second valve body (8) is displaceable arranged and the second valve body (8) includes a narrow part (8") in the home position positioned opposed to the second part channel (4") and that said narrow part has an extension being equally long as, or longer than the distance between the opening of the first part channel (4') in the cylinder (2) and the opening of the second part channel (4") in the first part channel (4').

8. Pressure pulse generator according to claim 3, characterized in that the second channel (4) consisting of two part channels (4',4") where the second part channel (4") will lead from the high pressure source HP to the first part channel (4') in which the second valve body (8) is displaceable arranged and the second valve body (8) includes a narrow part (8") in the home position positioned opposed to the second part channel (4") and that said narrow part has an extension being equally long as, or longer than the distance between the opening of the first part channel (4') in the cylinder (2) and the opening of the second part channel (4") in the first part channel (4').

9. Pressure pulse generator according to claim 2, characterized in that it is included in a valve actuator having an engine valve (11) and that the actuator piston (3) rests on or is rigidly connected to the engine valve.

10. Pressure pulse generator according to claim 3, characterized in that it is included in a valve actuator having an engine valve (11) and that the actuator piston (3) rests on or is rigidly connected to the engine valve.

11. Pressure pulse generator according to claim 4, characterized in that it is included in a valve actuator having an engine valve (11) and that the actuator piston (3) rests on or is rigidly connected to the engine valve.

* * * * *